US005809648A

United States Patent [19]

Kurth et al.

[11] Patent Number: 5,809,648

[45] Date of Patent: Sep. 22, 1998

[54] WHIRLPOOL JET MANIFOLD

[75] Inventors: Michael J. Kurth, Sheboygan; John M. Bloemer, Madison, both of Wis.

[73] Assignee: Kohler Co., Kohler, Wis.

[21] Appl. No.: 646,011

[22] Filed: May 7, 1996

Related U.S. Application Data

[63] Continuation of Ser. No. 352,667, Dec. 9, 1994, abandoned.

[51] Int. Cl.[6] .................. B23P 17/00

[52] U.S. Cl. .................. 29/890.142; 4/541.4; 4/541.6; 29/412

[58] Field of Search .................. 4/492, 507, 541.3, 4/541.4, 541.6, 567, 568, 601, 696; 29/412, 415, 890.142

[56] References Cited

U.S. PATENT DOCUMENTS

| | | | |
|---|---|---|---|
| 688,057 | 12/1901 | Bridgman | 4/569 |
| 2,759,767 | 8/1956 | McGaffey | 239/566 X |
| 3,420,226 | 1/1969 | Berry, Sr. | 4/541.3 X |
| 3,946,449 | 3/1976 | Mathis | 4/541.6 |
| 3,948,252 | 4/1976 | Montagne | 601/169 |
| 4,168,705 | 9/1979 | Raab | 601/169 |
| 4,257,559 | 3/1981 | Noren | 239/283 |
| 4,264,039 | 4/1981 | Moreland | 4/541.6 X |
| 4,320,541 | 3/1982 | Neenan | 4/492 |
| 4,349,073 | 9/1982 | Zublin | 166/312 |
| 4,358,862 | 11/1982 | Altman et al. | 4/541.6 |
| 4,416,030 | 11/1983 | Reynoso | 4/541.6 |
| 4,586,204 | 5/1986 | Daniels | 4/541.4 |
| 4,671,463 | 6/1987 | Moreland et al. | 4/541.6 X |
| 4,999,901 | 3/1991 | Toratani et al. | 29/415 |
| 5,000,665 | 3/1991 | Moeller | 4/541.6 X |
| 5,142,714 | 9/1992 | Klotzbach | 4/541.6 |

*Primary Examiner*—Robert M. Fetsuga

*Attorney, Agent, or Firm*—Quarles & Brady

[57] ABSTRACT

A multipurpose jet manifold arrangement for use in conjunction with hydro-massage spas and whirlpools. The manifold arrangement can be plumbed to both water and air from various positions so as to facilitate use at various locations in the tub. Further, it can be easily severed into separate single nozzle housings for use as a single nozzle. In a preferred manner, the manifold arrangement is molded from a plastic material.

2 Claims, 3 Drawing Sheets

FIG. 1
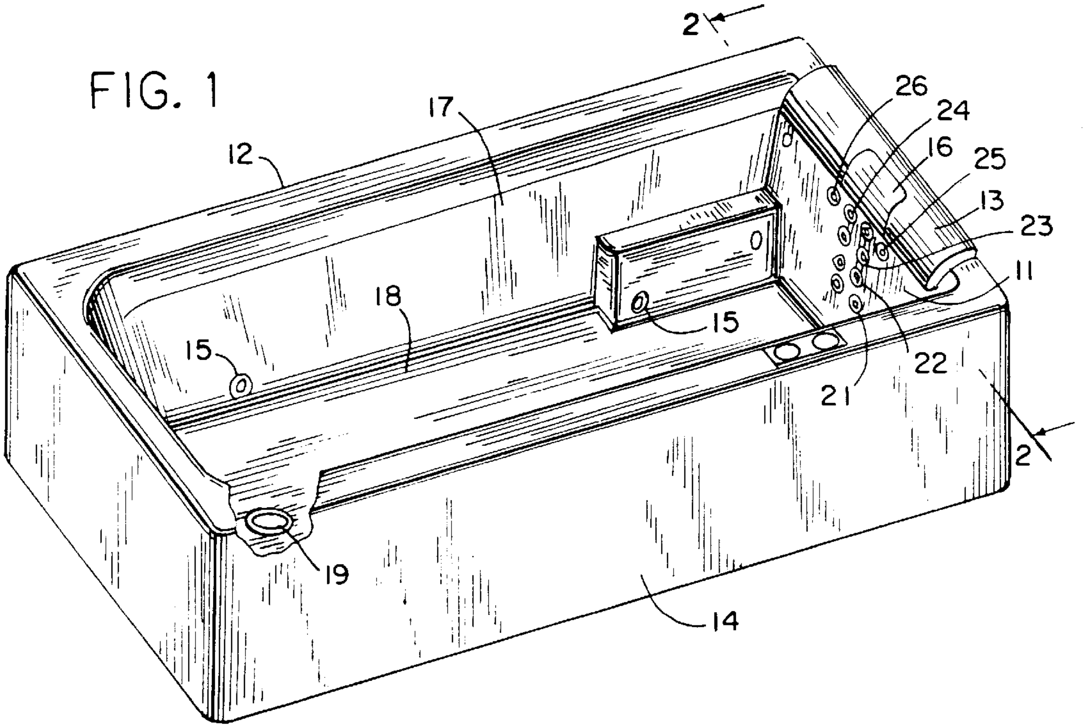
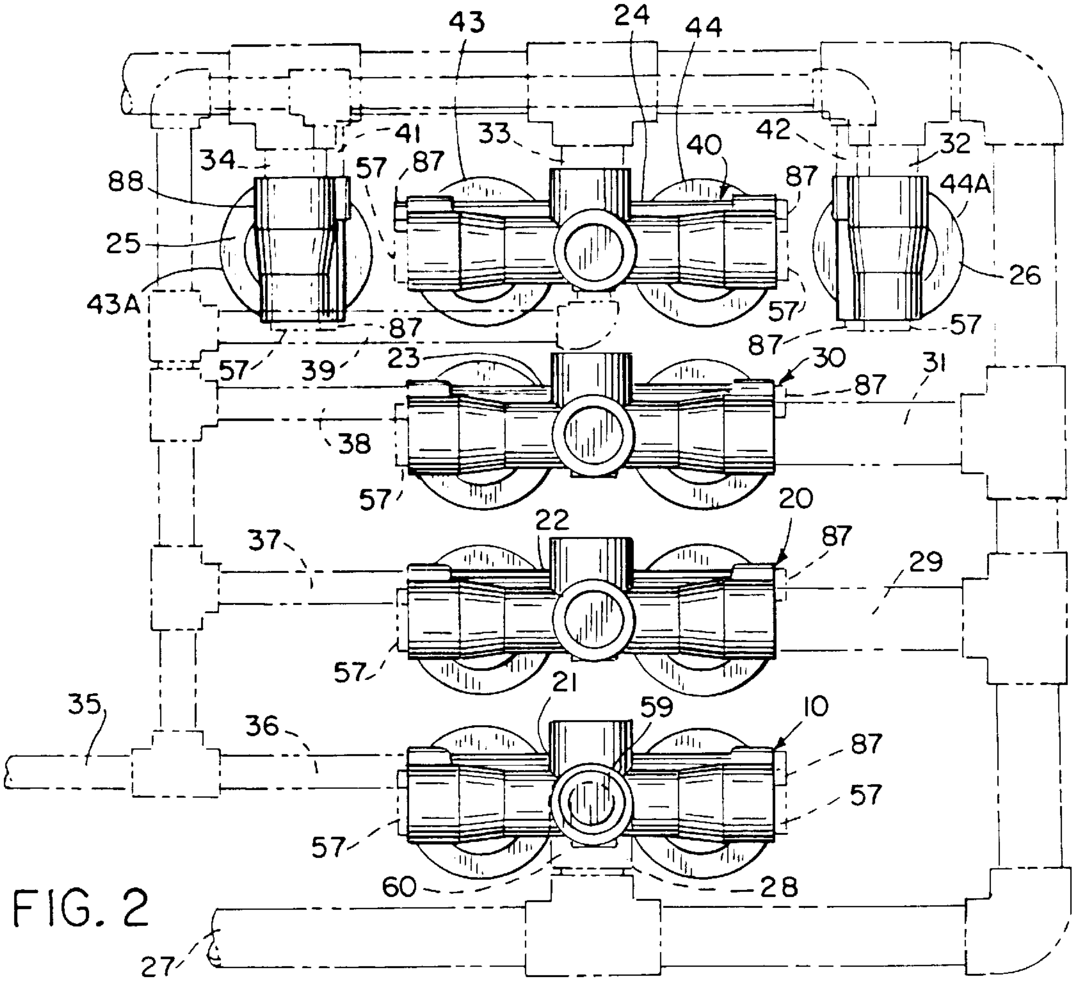
FIG. 2

WHIRLPOOL JET MANIFOLD

This is a continuation of application Ser. No. 08/352,667 filed Dec. 9, 1994, abandoned.

BACKGROUND OF THE INVENTION

A. Field of the Invention

The present invention relates to bathing fixtures such as hydro-massage spas and whirlpools. More particularly, it relates to a multipurpose jet manifold for use with the bathing fixtures.

B. Description of the Art

The use of single jet manifolds which introduce air and water into a hydro-massage whirlpool bath are well known. For example, see U.S. Pat. No. 4,320,541. It is also known to interconnect nozzles in a manifold type arrangement from either end of the manifold such as shown in U.S. Pat. No. 4,349,073. U.S. Pat. No. 2,759,767 illustrates the connection of an inlet to a dispensing tube where the connection is made centrally.

However, the prior art does not provide single piece multipurpose jet manifolds which can be plumbed at various positions to facilitate use in a hydro-massage whirlpool at various locations. Neither does it provide one which can be easily severed into component parts in order to provide additional nozzle housings. Further, the prior art does not show such nozzle manifold constructions which can be easily manufactured through reduced cost molding technology. Thus, an improved jet manifold is desired.

SUMMARY OF THE INVENTION

In one aspect, the invention provides a one piece manifold having a housing with a first transverse passageway for receiving a water supply. There is a second transverse passageway for receiving an air supply. A plurality of nozzle receiving chambers is positioned along the passageways each of which is in communication with both passageways so that when water enters the chambers from the first passageway, it can entrain air from the second passageway.

In another aspect, the chambers have a central axis which is essentially perpendicular to the passageway.

In another preferred embodiment, air and water are supplied to the passageways from lateral ends of the passageways, and there are two nozzle receiving chambers.

In yet another aspect, there is a radial water inlet connector to the first transverse passageway and a radial air inlet to the second transverse passageway, the inlets being positioned along the passageways laterally inward of both chambers.

In still another aspect, the air and water inlets are closed.

In another aspect, opposing lateral ends of the transverse passageways are closed with sealed plug means.

In a further aspect, the manifold is severed into at least three pieces so as to result in at least two separate manifolds each having the passageways for receiving a water and air supply at one end and a plug means at another end.

The objects of invention therefore include:

a. providing a multipurpose jet manifold arrangement which is adaptable to being plumbed at various positions;

b. providing a multipurpose jet manifold arrangement which can be severed into discrete components;

c. providing a multipurpose jet manifold arrangement which is adaptable to being used in a variety of positions and grouping in a hydro-massage bathing fixture;

d. providing a multipurpose jet manifold arrangement which is easily secured to the wall of a hydro-massage bathing fixture; and e. providing a multipurpose jet manifold arrangement which is easily molded.

BRIEF DESCRIPTION OF THE DRAWINGS

FIG. 1 is a top perspective view of a whirlpool tub that incorporates the present invention;

FIG. 2 is an assembly view showing the multipurpose jet manifold arrangement interconnected to water and air inlet conduits;

DESCRIPTION OF THE PREFERRED EMBODIMENTS

Figure 3:
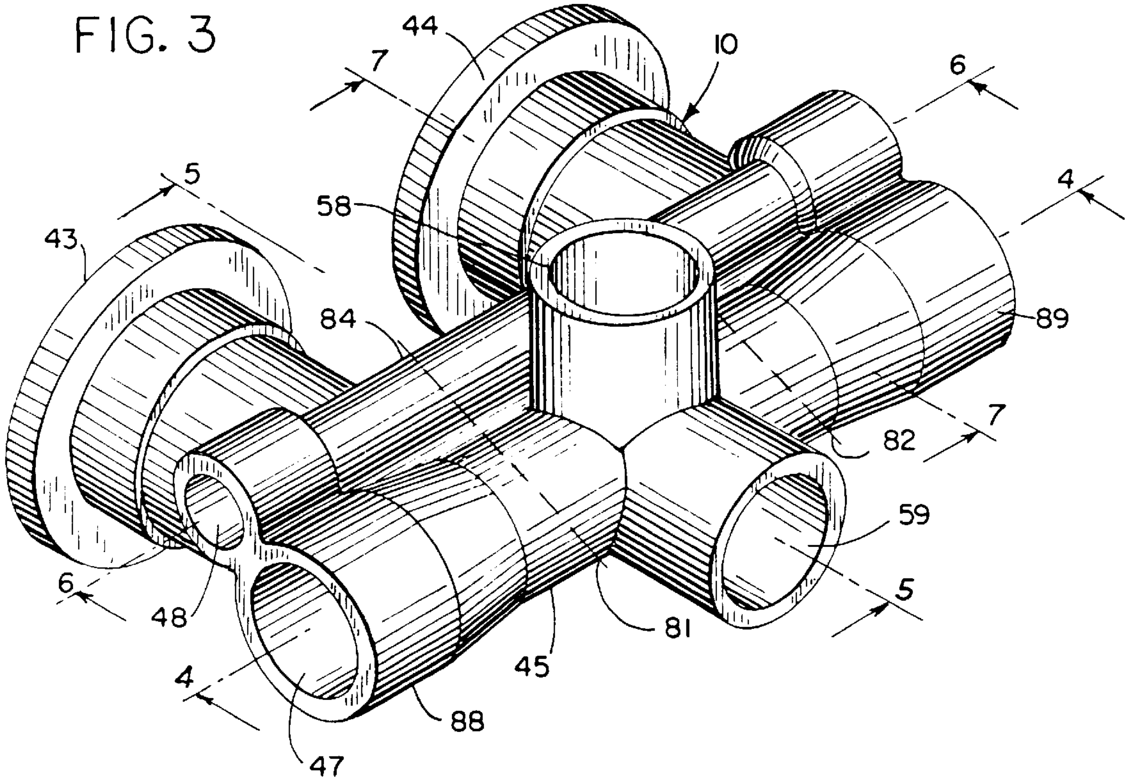
FIG. 3 is a top perspective view of the multipurpose jet manifold.

Referring to FIGS. 1 and 3, there is shown the multipurpose jet manifold, generally 10, for use in conjunction with a hydro-massage whirlpool 12 composed of a tub 14 with a side wall 17 having whirlpool nozzles 15 and a tub floor 18 with a drain 19. The tub end wall 11 houses the pairs of nozzles 21, 22, 23 and 24, as well as the singular nozzles 25 and 26. Each nozzle pair is provided by the multipurpose jet manifold arrangements 10, 20, 30 and 40 with all of them being the same as the manifold shown in FIG. 3. Nozzles 25 and 26 are also provided by portions of the jet manifold 10 as will be later explained. A cushion 13 is supported on top of the tub end wall 14. It has a central cover 16 behind which is placed a pair of neck spray nozzles (not shown). These are described in copending application Ser. No. 08/376,575 filed Jan. 23, 1995 and is commonly assigned.

Referring to FIG. 2, a water supply line 27 is connected to the pressure side of a pump to supply pressurized water to the jet manifolds 10, 20, 30 and 40 and accordingly nozzle pairs 21, 22, 23 and 24, such as by the branch lines 28, 29, 31 and 33. Water is also supplied to the nozzles 25 and 26 through the branch lines 34 and 32. Air is also supplied to the jet manifolds 10, 20, 30 and 40 by the air intake conduit 35 and the branch lines 36, 37, 38 and 39. Air is supplied to the nozzles 25 and 26 through the branch lines 41 and 42. It will be noted in conjunction with FIG. 2 that the branch lines and air lines are not connected to all of the jet manifolds 10–40 in the same manner. This is better understood in conjunction with the description of jet manifold 10 as shown in FIGS. 3–7.

Figure 4:
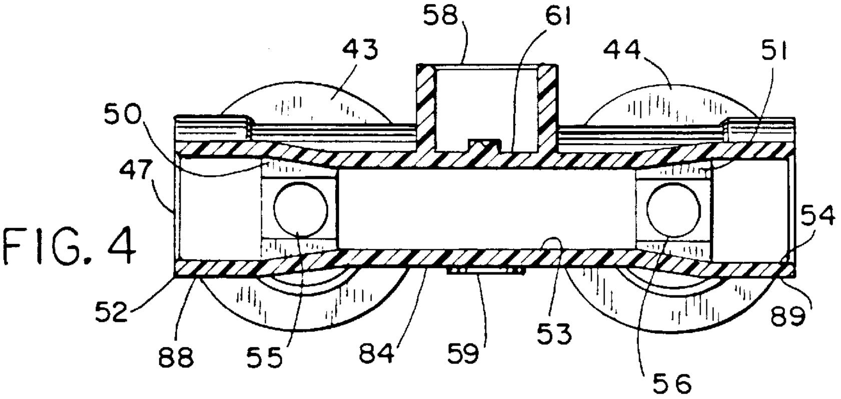
FIG. 4 is a sectional view taken along line 4—4 of FIG. 3.
Figure 5:
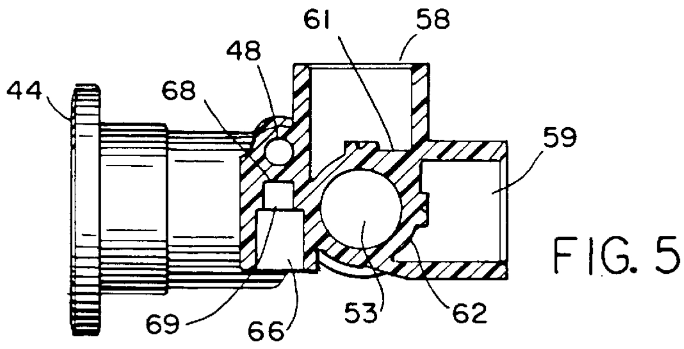
FIG. 5 is a sectional view taken along line 5—5 of FIG. 3.

As seen therein, jet manifold 10 has a tubular body 45 with nozzle receiving chambers or housings 43 and 44 extending in a parallel manner from common and parallel water and air passages 47 and 48. The manifold 10 is molded from a plastic material. The water passage 47 has the enlarged connecting portions 52 and 54 at opposing ends, as well as tapered wall sections 50 and 51 and a central or an intermediary section 53. Passageways 55 and 56 convey water from the passageway 47 to the nozzle housings 43 and 44. As indicated in conjunction with FIG. 2, passageways 47 are closed at one end by the closure caps 57 which are sealed thereto. Referring to FIGS. 4 and 5, there are the intermediate water inlet passages 58 and 59 leading to the intermediate section 53, but they are sealed therefrom such as by the removable walls 61 and 62, respectively.

Figure 6:
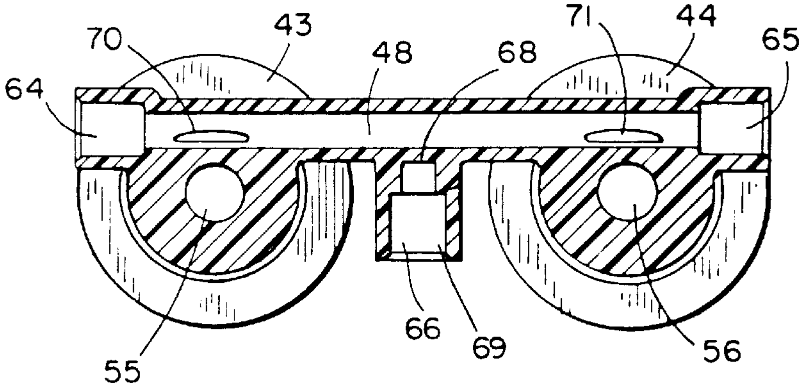
FIG. 6 is a sectional view taken along line 6—6 of FIG. 3.

Referring specifically to FIG. 6, air is supplied to the nozzle housings 43 and 44 by the common air passage 48 having the enlarged connecting portions 64 and 65. An auxiliary or blind passage 69 is also provided for air having the enlarged connecting portion 66. This blind passage is closed by the removable wall 68. Slots 70 and 71 provide communication between the air passage 48 and the nozzle housings 43 and 44 and permit air to be drawn into the housings 43 and 44 by water passing under pressure through passageways 55 and 56.

Figure 7:
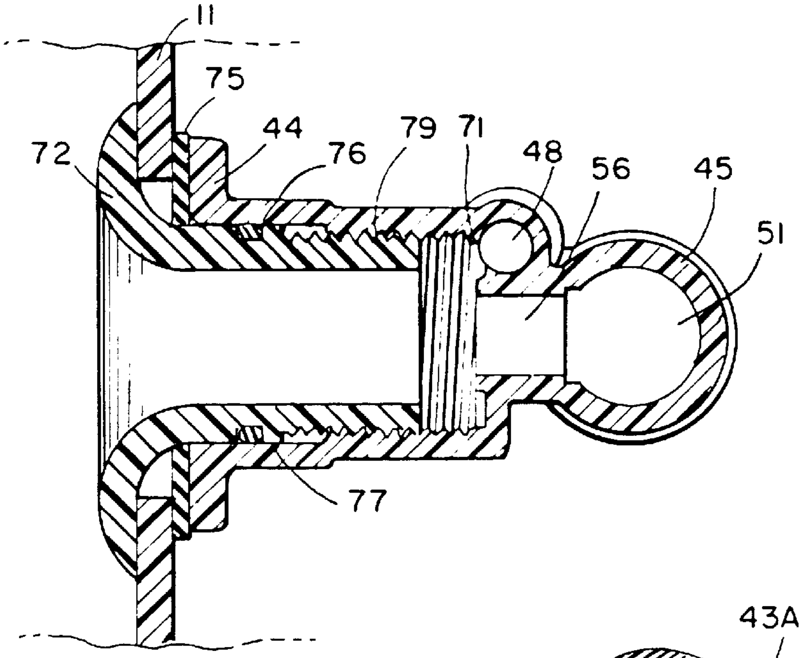
FIG. 7 is a sectional view taken along line 7—7 of FIG. 3.

FIG. 7 shows the attachment of the nozzle housing 44 to the tub wall 11. A nozzle member 72 is threaded to the nozzle housing 44 such as by the threads 79. This affords connection of the nozzle housing 44 to the tub wall 11. A seal 75 is placed between the nozzle housing 44 and the tub wall 11. Also a seal 76 in the form of an O-ring is placed in groove 77 in the nozzle member 72 between nozzle housing 44 and the nozzle member.

Figure 8:
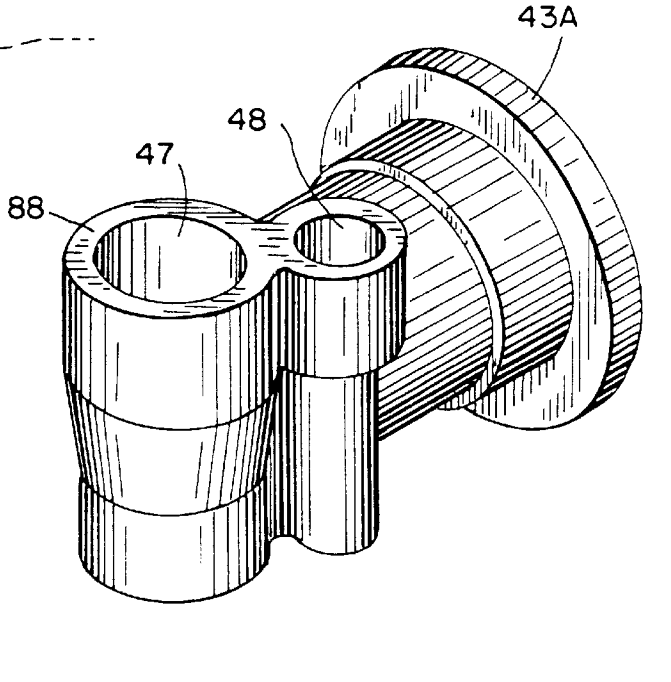
FIG. 8 is a perspective view illustrating one of the jet nozzle housings which can be severed from the multipurpose jet manifold of FIG. 3.

FIG. 8 illustrates a housing 43A for singular nozzle such as 25. It would be cut or severed from the jet manifold 10 by cutting the manifold along the cut lines 81 and 82. Thus, the same component parts are employed and are designated by the "A" suffix. Two such nozzle housings would be afforded with the center section 84 being discarded to result in two single housings such as 43A and 44A for the nozzles 25 and 26.

An important and unique feature of the jet manifold 10 is seen in conjunction with FIGS. 2, 3 and 4. For example, in looking at manifold 10 which forms the bottom nozzle pairs 21, it is seen that the water is supplied through the blind passageway 59 by connector 60. In this instance, the wall 62 is removed from the blind passage 59. Plugs 57 are applied to the opposing ends of the water passage 47. Also, a plug 87 is applied to the air passage 48 opposite the connection of the branch air line 36 to air passage 48.

Water and air are supplied to the manifolds 20 and 30 forming the nozzle pairs 22 and 23 in the same manner with the branch lines 29 and 31 being connected to the connecting portion 54 of water passage 47 at one end with the opposing end being plugged such as shown at 57. Air is introduced in the same manner as described in conjunction with jet manifold 10.

As to jet manifold 40, water is introduced into the intermediate passage 58 which is opened by removing wall 61. Plugs 57 are applied at ends of the water passage 47. In this instance, branch air inlet line 39 is connected to enlarged connecting portion 66, and air is introduced into the passage 69 which has the wall 68 removed so that communication is made with air passage 48. Plugs are applied such as at 87 to the opposing ends of the air passage 48.

Concerning the single nozzles 25 and 26, these have the water branch lines 34 and 32 connected to the large diameter portions 88 and 89 (See FIG. 4) with the center section 84 removed and plugs 57 placed in the passage 47 which previously connected with the center section 84. Air is supplied by connecting the branch lines 41 and 42 to the enlarged portions 64 and 65 as seen in FIG. 6. Plugs 87 are placed in the passage 48 which previously connected with the center section 84.

It will therefore be appreciated that there is now provided a jet manifold arrangement which affords the versatility of being plumbed at various positions. The manifold arrangement can afford not only nozzle pairs but also can be severed in order to afford two singular nozzle structures.

Still another feature of the jet manifold is the molding of the manifold in one piece yet being able to provide the various water and air passageways.

Thus the invention provides an improved manifold housing for nozzles. While a certain geometric pattern of nozzles has been shown in conjunction with a bathing tub, it is obvious that any other configurations could be utilized from the manifold arrangement such as a string of three or more nozzle housings. Additional single nozzles could also be used in conjunction with these. While certain air and water passageways are molded closed, these could, if desired, be molded open and later closed with plugs. While specific materials have been indicated for fabrication of the manifold jet assembly, other materials which provide ease of severability could also be utilized. These and other modifications are meant to be viewed within the scope of the application.

We claim:

1. A method for the production of nozzle assemblies from a one piece manifold, the one piece manifold comprising a one piece integrally molded housing having a first transverse passageway for receiving a water supply, a second transverse passageway for receiving an air supply, a first nozzle receiving chamber positioned along the passageways laterally one side of a severing region and at least a second nozzle receiving chamber positioned along the passageways on an opposite side of the severing region, each said nozzle receiving chamber being in communication with both passageways so that when the water enters both chambers from the first passageway, it can entrain air in both nozzles from the second passageway, and at least one radial inlet connected at the severing region to at least one of the transverse passageways adjacent to and between the first and second nozzle receiving chambers and on the opposite side of the severing region from the first nozzle receiving chamber, the method comprising:

severing transversely at least once through the severing region to effect two separate nozzle assemblies, each with a nozzle chamber that can be connected to a water and air passageway and each being capable of entraining air into water when air and water are supplied.

2. The method of claim 1, wherein said serving region is defined by a first severing portion on the one piece manifold between the first nozzle receiving chamber and the radial inlet and a second severing portion between the second nozzle receiving chamber and the radial inlet and severing is effected through both portions.

* * * * *

UNITED STATES PATENT AND TRADEMARK OFFICE
CERTIFICATE OF CORRECTION

PATENT NO. : 5,809,648
DATED : September 22, 1998
INVENTOR(S) : Michael J. Kurth et al.

It is certified that error appears in the above-identified patent and that said Letters Patent is hereby corrected as shown below:

Column 2, line 54

Claim 2, line 1 - before "region" "serving" should be --severing--.

Signed and Sealed this

Eighteenth Day of May, 1999

Attest:

Q. TODD DICKINSON

Attesting Officer

*Acting Commissioner of Patents and Trademarks*